US010801205B2

(12) United States Patent
Leatherman et al.

(10) Patent No.: US 10,801,205 B2
(45) Date of Patent: Oct. 13, 2020

(54) INSULATION BOARD WITH IMPROVED PERFORMANCE

(71) Applicant: CARLISLE CONSTRUCTION MATERIALS, LLC, Carlisle, PA (US)

(72) Inventors: Matthew Leatherman, Carlisle, PA (US); Xuan Zhang, Carlisle, PA (US); Cody Turnow, York, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 16/601,203

(22) Filed: Oct. 14, 2019

(65) Prior Publication Data

US 2020/0123776 A1 Apr. 23, 2020

Related U.S. Application Data

(60) Provisional application No. 62/749,530, filed on Oct. 23, 2018, provisional application No. 62/819,089, filed on Mar. 15, 2019.

(51) Int. Cl.
*E04D 1/28* (2006.01)
*E04B 1/90* (2006.01)
(Continued)

(52) U.S. Cl.
CPC ............... *E04D 1/28* (2013.01); *B32B 5/022* (2013.01); *B32B 5/024* (2013.01); *B32B 5/245* (2013.01); *B32B 5/26* (2013.01); *B32B 17/067* (2013.01); *E04B 1/90* (2013.01); *B32B 2255/02* (2013.01); *B32B 2255/26* (2013.01); *B32B 2262/0253* (2013.01); *B32B 2307/7265* (2013.01); *B32B 2419/06* (2013.01); *E04B 2001/742* (2013.01)

(58) Field of Classification Search
CPC ........... B32B 5/26; B32B 5/024; B32B 5/245; B32B 2419/06; E04D 1/28
See application file for complete search history.

(56) References Cited

U.S. PATENT DOCUMENTS

| 4,764,420 A | 8/1988 | Gluck et al. |
| 5,001,005 A | 3/1991 | Blanpied |

(Continued)

FOREIGN PATENT DOCUMENTS

| EP | 0019465 B1 | 9/1983 |
| EP | 0799687 A2 | 10/1997 |

(Continued)

OTHER PUBLICATIONS

International Searching Authority, International Search Report and Written Opinion for corresponding International Application No. PCT/US2019/056117, dated Dec. 31, 2019, 11 pages.

*Primary Examiner* — Hai Vo
(74) *Attorney, Agent, or Firm* — Gordon Rees Scully Mansukhani LLP; David R. Heckadon

(57) ABSTRACT

An insulation board assembly, having: a foam insulation board; a top facer attached onto a top side of the foam insulation board, the top facer being made of woven material; and a bottom facer attached onto a bottom side of the foam insulation board, the bottom facer being made of woven material. The top and bottom woven facers may have upper and lower coatings and non-woven layers on either side and woven and non-woven layers may be held together with a tie layer.

8 Claims, 2 Drawing Sheets

(51) Int. Cl.
  *B32B 5/24* (2006.01)
  *B32B 5/02* (2006.01)
  *B32B 5/26* (2006.01)
  *B32B 17/06* (2006.01)
  *E04B 1/74* (2006.01)

(56) References Cited

U.S. PATENT DOCUMENTS

| | | |
|---|---|---|
| 5,098,778 A | 3/1992 | Minnick |
| 5,735,092 A | 4/1998 | Clayton et al. |
| 5,891,563 A | 4/1999 | Letts |
| 6,044,604 A | 4/2000 | Clayton et al. |
| 6,093,481 A | 7/2000 | Lynn et al. |
| 6,355,701 B1 | 3/2002 | Soukup et al. |
| 6,368,991 B1 | 4/2002 | Homer, Jr. et al. |
| 6,872,673 B2 | 3/2005 | MacAulay |
| 7,607,271 B2 | 10/2009 | Griffin et al. |
| 7,749,598 B2 | 7/2010 | Agrawal |
| 7,785,703 B2 | 8/2010 | Agrawal |
| 7,811,663 B2 | 10/2010 | Paradis et al. |
| 8,105,685 B2 | 1/2012 | Paradis et al. |
| 8,287,997 B2 | 10/2012 | Paradis et al. |
| 8,453,390 B2 | 6/2013 | Letts et al. |
| 8,479,467 B2 | 7/2013 | Johnson et al. |
| 8,617,699 B2 | 12/2013 | Paradis et al. |
| 9,145,498 B2 | 9/2015 | Ultsch |
| 9,677,277 B2 | 6/2017 | Kalkanoglu et al. |
| 9,701,803 B2 | 7/2017 | Cobb et al. |
| 10,087,634 B2 | 10/2018 | Johnson et al. |
| 2005/0284065 A1 | 12/2005 | Shaffer |
| 2007/0234667 A1 | 10/2007 | Lubker, II et al. |
| 2011/0033684 A1 | 2/2011 | Agrawal |
| 2011/0131910 A1 | 6/2011 | Paradis et al. |
| 2013/0164524 A1 | 6/2013 | Letts et al. |
| 2013/0264012 A1 | 10/2013 | Johnson et al. |
| 2015/0040503 A1 | 2/2015 | Tackett et al. |
| 2016/0153127 A1 | 6/2016 | Avio |
| 2016/0236455 A1 | 8/2016 | Fay et al. |
| 2016/0361894 A1* | 12/2016 | Ciuperca .............. B32B 5/028 |
| 2017/0015027 A1 | 1/2017 | Letts et al. |
| 2017/0203555 A1 | 7/2017 | Wang et al. |
| 2017/0268143 A1 | 9/2017 | Paradis et al. |
| 2017/0328062 A1 | 11/2017 | Letts et al. |
| 2017/0362835 A1 | 12/2017 | Nielsen et al. |
| 2018/0087277 A1 | 3/2018 | Brandt et al. |

FOREIGN PATENT DOCUMENTS

| | | |
|---|---|---|
| EP | 1360382 B1 | 10/2006 |
| EP | 0940249 B1 | 11/2008 |
| EP | 1655421 B1 | 1/2012 |
| EP | 3281782 B1 | 2/2019 |
| WO | 2000069624 A1 | 11/2000 |
| WO | 2009023170 A2 | 2/2009 |
| WO | 2015134889 A1 | 9/2015 |

* cited by examiner

INSULATION BOARD WITH IMPROVED PERFORMANCE

RELATED APPLICATIONS

The present application claims priority to U.S. Provisional Patent Application Ser. No. 62/749,530, filed Oct. 23, 2018, entitled Insulation Board Having Woven Facers, and to U.S. Provisional Patent Application Ser. No. 62/819,089, filed Mar. 15, 2019, entitled Insulation Board With Improved Performance, the entire disclosures of which are incorporated herein by reference in their entireties for all purposes.

TECHNICAL FIELD

The present invention relates to improved insulation board performance imparted by enhanced physical properties through the use of woven mats as facers for insulation boards used in building construction in general and in roofing construction in particular. When used in a roof assembly, the present invention permits the roofing system to meet the Very Severe Hail (VSH) testing rating with a low or typical density insulation board.

BACKGROUND OF THE INVENTION

Currently, facers for polyurethane or polyisocyanurate (Polyiso) foam roofing insulation boards are typically made either from a Glass Reinforced Felt (GRF) facer or from a Coated Glass Facer (CGF) material. Facers serve a few purposes on the insulation board and in the roof system. For example, facers help provide structural integrity to the foam board and protect the friable foam surface from forces exerted by hail, foot traffic, heavy HVAC equipment and construction equipment. Facers also provide added strength to the foam board with regard to wind uplift performance. Both GRF and CGF contain fiberglass and thus are skin irritants during the manufacturing process and in end-use application. With GRF facers, glass fibers are added to the paper to improve dimensional stability, especially when the facer is wet. However, the glass fibers do not prevent the board from warping due to dimensional change in the GRF facer after exposure to moisture, or from losing strength while exposed to moisture, such as a leak. While coated glass facers do offer improved resistance to moisture and mold when compared to GRF facers, these facers discolor after exposure to moisture, and are rigid so they do not spread force across the board, and also have the tendency to absorb excessive amounts of chemicals during the production of the foam board. Additional disadvantages of these fiberglass containing facer materials include: (a) they do not offer sufficiently strong indentation resistance, (b) they tend to peel off and delaminate from the polyurethane or polyisocyanurate insulation boards, and (c) the glass fiber content results in handling complaints during production and installation of the boards.

Importantly, the fasteners that secure these foam roofing boards to the roof also pass through the boards' facers. Unfortunately, wind uplift across the boards can cause fastener pull-through which results in failure of the fully adhered roof system. To improve wind uplift performance of the roof system, additional fasteners are typically driven through the insulation board to keep the board anchored to the roof deck.

Therefore, what is instead desired is a polyurethane or polyisocyanurate foam roofing insulation board facer material that would both provide load spreading and added surface strength. Specifically, it would be desirable to provide a facer that assists in spreading surface loads such that the potential for fastener pull-through during wind uplift can be reduced or eliminated. The advantage of load spreading to prevent fastener pull-through also helps to firmly secure the foam insulation board to the roof. Another advantage of such added surface strength is that it would offer increased indentation resistance. This indentation resistance would be advantageous against hail hitting the roof. Most preferably, the ideal roofing system would be able to pass the recently announced "Very Severe Hail" test rating announced by Factory Mutual as described in FM 4470 (Class 1—VSH). In addition, a facer having the desired indentation resistance would also be advantageous against workers kneeling on the roof or foot traffic on the roof during installation or roof repair. As will be explained, the present system provides this strength and load-spreading advantages. In fact, the present system has been shown to meet the Very Severe Hail (VSH) test rating. In addition, the present facer even preferably permits the roofing system to meet the Very Severe Hail (VSH) test rating even when a low or typical density insulation board is used (For example, such a density range can even be as low as found in typical density insulation boards, and could even be in the range of 0.5 to 6.0 pcf).

While load spreading will allow higher wind uplift values to be achieved with equivalent fasteners, load spreading will also allow an equivalent uplift to be achieved utilizing fewer fasteners. Reducing the number of fasteners in a roof system while maintaining wind uplift performance is highly advantageous because it requires less labor to install a roof system with fewer fasteners, fewer fasteners reduces the material cost of the roof system, and fewer fasteners results in fewer penetrations of the polyurethane or polyisocyanurate foam board, minimizing heat sinks, thereby leading to improved insulating performance of the insulation board.

SUMMARY OF THE INVENTION

In one aspect, the present invention comprises an insulation board assembly, having: a foam insulation board (which may optionally be polyurethane or polyisocyanurate, or a phenolic material or an expanded polystyrene material (EPS)); a woven mat as the top facer attached onto a top side of the foam insulation board; and a woven mat as the bottom facer attached onto a bottom side of the foam insulation board. Optionally, the woven facers may be made of natural and/or synthetic yarns and/or tapes. Suitable synthetic yarns or tapes can be made from polymers such as polyethylene, ethylene and alpha-olefin copolymers, polypropylene, propylene and alpha-olefin copolymers, nylon, polyester, acrylic polyester, polyamide, aramid etc. Suitable natural yarns can be made from nature fibers, such as cotton, cellulose, wool, rayon, silk, hemp, sisal, etc.

The woven mats can have different weave density. Fabric Mesh is a measure of the density of the fabric weave as the number of yarns or tapes per inch in both the Warp (machine) and Weft (cross) directions. Ends per inch (EPI) is the number of warp yarns or tapes per inch of woven fabric and picks per inch (PPI) is the number of weft yarns and tapes per inch of woven fabric. For example, the weave density can be 2 tapes per inch×2 tapes per inch (EPI×PPI) to 100 tapes per inch×100 tapes per inch. Preferably, the weave density would be 4×4 to 60×60 mesh. Most preferably, the weave density would be 4×4 to 30×30 mesh. Optionally, the woven mats have different weave density along warp and weft direction, for example, the weave density can optionally be 4×8 mesh in one embodiment.

The present woven mats can have different weights, typically measured by the fabric weight in ounces per square yard or grams per square meters. For example, the woven mat weight can optionally be from 10 gsm to 400 gsm. Preferably, the woven mat weight could be from 20 gsm to 200 gsm. Most preferably, the woven mat weight could be from 40 gsm to 100 gsm. Alternatively, the woven mats can have different thicknesses. For example, the woven mat thickness can be from 1 mil to 200 mil. Preferably, the woven mat thickness could be from 2 mil to 100 mil. Most preferably, the woven mat thickness could be from 2 mil to 50 mil.

Optionally, the woven mat can have a coating on one or both sides of the surface. The coating can be of different polymer compositions, such as polyethylene, ethylene and alpha-olefin copolymers, polypropylene, propylene and alpha-olefin copolymers, silicones, acrylates, natural rubber, styrene-butadiene rubber, etc. Advantageously, such coating will provide bleed through resistance during the polyurethane or polyisocyanurate board manufacturing process, water resistance during foam board transportation, and slip and water resistance during field installation. The coating may additionally provide improved adhesion to the polyurethane or polyisocyanurate foam during manufacturing and provide improved compatibility and adhesion to bonding adhesives during field installation. The bonding adhesives can consist of different polymer compositions, such as polyurethane, nitrile, neoprene, chloroprene, silane-terminated polyether, styrene butadiene rubber, acrylic, ethylene propylene diene monomer (EPDM), etc.

Optionally, each of the top and bottom woven mats can have an additional layer of non-woven material laminated to one or both sides. The lamination could optionally be done with adhesives or with a tie layer. When the non-woven layer is in contact with the polyurethane or polyisocyanurate insulating foam during the manufacturing process, the non-woven layer may increase the surface roughness and surface area of the woven mat to allow the woven mat to have better adhesion or bonding with the polyurethane or polyisocyanurate foam. When the non-woven layer is positioned on the outside (i.e.: top or bottom) of the foam insulation board, it may enhance the slip resistance and improve adhesion performance with bonding adhesives during the field installation. The non-woven fiber can optionally be made of different polymer composition, such as polyester, polyethylene, ethylene and alpha-olefin copolymers, polypropylene, propylene and alpha-olefin copolymers, nylon, glass, Kevlar, basalt, carbon fiber, etc.

Optionally, the woven mats may be laminated with a glass scrim, glass mat, carbon fibers scrim, or coated PET scrim. When laminated to the woven mat, these materials could potentially improve dimensional stability of the facer and the insulation board.

Optionally, the woven mats can be made of low shrinkage polymer yarns or tapes. The shrinkage rate of polymer tape can be assessed by the percentage of length change when the polymer tape is heated from room temperature to 100° C. Preferably, the polymer tape used in the woven mat has <10% in shrinkage rate. Most preferable, the polymer tape has <5% shrinkage rate.

Optionally, flame retardants can be added to polymer yarns or tapes to enhance the fire resistance of the woven facer.

In another aspect, the present invention comprises a rolled woven facer material having a sufficiently desirable strength in both its machine direction and its cross direction. This rolled woven material can then be used as a top and/or bottom facer to a polyurethane or polyisocyanurate foam insulation board. Preferably, this rolled woven facer material is quite thin and has low weight.

In preferred embodiments, the present woven polypropylene facer has a tensile strength greater than 80 lbf/3 inch in both a machine direction and a cross direction, and also has a tongue tear strength of over 15 lbf in both a machine direction and a cross direction.

Advantages of the present woven facer material include the fact that it provides added surface strength, load-spreading and durability as compared to existing GRF and CGF facers. Such added surface strength and load-spreading allows for foot traffic and kneeling on the insulation boards during roof installation. It also provides superior hail resistance and equivalent mold/moisture resistance to that of CGF. Specifically, the present roofing system comprising the present facer has been shown to meet the "Very Severe Hail" test rating announced by Factory Mutual as described in FM 4470 (Class 1—VSH).

The present woven facer is preferably a light but strong and heavy duty material. An advantage of the present woven facer material is that it has higher fastener pull through force, and thus provides excellent wind uplift resistance after the insulation board has been secured to the roof. In addition, the present woven facer system is also very durable and lengthens the effective lifespan of the foam roofing insulation board. In optional embodiments, the woven facers are made of a polymer, such as polyethylene, ethylene and alpha-olefin copolymers, polypropylene, propylene and alpha-olefin copolymers, nylon, polyester, polyamide, etc. However, it is to be understood that other woven materials including both natural and synthetic yarns or tapes, such as cotton, cellulose, rayon, silk, hemp, sisal, etc. can be used as well.

As such, the present woven facer system also offers the advantages of a higher flex modulus and a higher fastener-plate pull-through resistance as compared to traditional GRF and CGF facers.

In the case of a woven polypropylene material, the present facer can optionally be made from a plastic film that has been drawn into filaments or tapes, and then woven to create a fabric sheet or mat. In these preferred aspects, the woven mat optionally comprises a nonwoven layer on one side that will promote adhesion to the polyurethane or polyisocyanurate foam and polymer coating on the other side that will enhance water, moisture and bleed through resistance. The polymer coating can optionally provide improved compatibility and adhesion to bonding adhesives during field installation.

Another advantage of the present woven facer material is its low cost. In addition, the present woven facer materials can optionally be made from recycled plastics, providing environmental benefits.

DETAILED DESCRIPTION OF THE PRESENT SYSTEM

Figure 1:
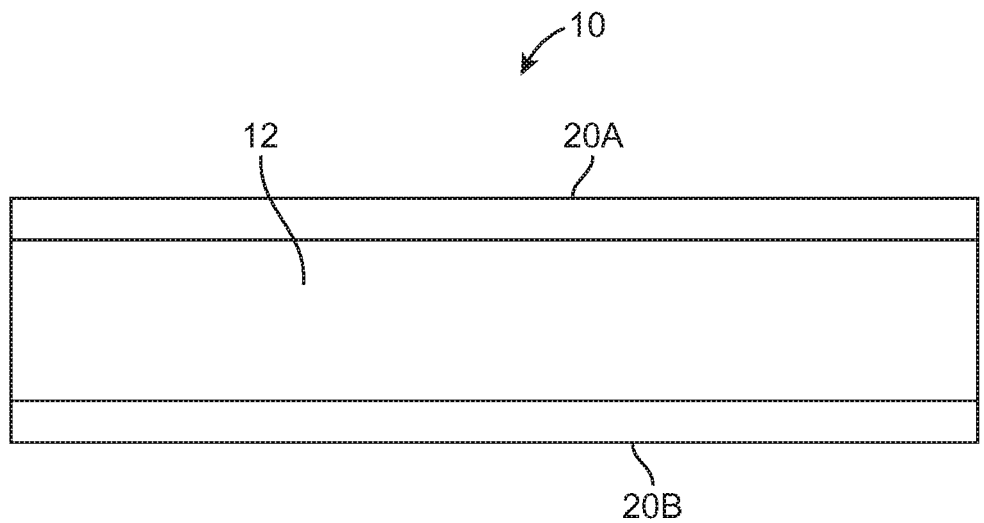
FIG. 1 is a sectional side elevation view of a foam insulation board with top and bottom woven facers.

As stated above, in one embodiment as seen in FIG. 1, the present system provides an insulation board assembly 10 that comprises: a foam insulation board 12 that may optionally be made of polyurethane or polyisocyanurate foam, or a phenolic material or an expanded polystyrene material (EPS)); a top woven facer 20A attached onto a top side of the foam insulation board, top facer 20A being made of woven material that may optionally include polypropylene; and a woven bottom facer 20B attached onto a bottom side of the foam insulation board, bottom facer 20B also optionally being made of woven polypropylene. In alternate aspects, other woven materials may be used instead, including both natural and synthetic fibers.

In another embodiment, the present system provides a thin, rolled woven facer material that has sufficient strength in both its machine and cross directions that can be attached onto the foam insulation board (for example, during an extrusion process with the foam being sandwiched between top and bottom woven facers).

Traditionally, polyurethane or polyisocyanurate is a closed-cell, rigid foam insulation board consisting of a foam core sandwiched between two facers. It is the most widely used insulating material for above-deck commercial roof construction in North America. In many existing systems, the facer materials are fiberglass, but even kraft paper has been used. These polyurethane or polyisocyanurate insulation boards are attached to the roof deck with various mechanical fasteners and construction adhesives or held in place with ballast stones or concrete pavers placed above the roofing membrane. Typically, the roofing membrane also may be mechanically attached through the foam insulation, adhered to the top polyurethane or polyisocyanurate facer or even held in place with ballast.

In accordance with the present system, the present inventors experimentally tested various facers (GRF, CGF, Nonwoven polyester and woven polypropylene facer materials). The results of these experimental tests are shown in Table 1, below:

TABLE 1

Common physical properties of different facer materials.

|  | GRF | CGF | Nonwoven PET | Woven PP |
| --- | --- | --- | --- | --- |
| Tensile (MD) (lbf/3 in.) | 46 | 69 | 107 | 132 |
| Tensile (CD) (lbf/3 in.) | 38 | 67 | 67 | 119 |
| Breaking Elongation-MD (%) | 1.7 | 2 | 39 | 14 |
| Breaking Elongation-CD (%) | 2 | 2 | 50 | 12 |
| Tear MD (lbf) | 0.4 | 0.6 | 6.8 | 47.0 |
| Tear CD (lbf) | 0.7 | 0.8 | 10.5 | 49.0 |

In addition, the present inventors also experimentally tested the same facer materials for "Pull-Through" and "wind uplift". The results of these experimental tests are shown in Table 2 below.

The Pull-Through test procedure is designed to evaluate the strength of substrate/stress plate combinations by using tensile loading. The test method described below utilizes a nominal 14×14 in. test sample and test jig. The test method is intended to be used to evaluate various membranes, membrane/stress plate combinations, substrates or substrate/stress plate combinations for comparison to each other in order to determine the products are to be used large scale wind resistance classification testing.

The detailed testing procedure is as follows. The 14×14 Substrate Test Jig is secured to the moving crosshead of the Tinius Olsen machine. When ready for testing, the sample is slid into the 14×14 Substrate Test Jig with the stress plate located on the underside of the test sample. The screw end of the fastener is then secured in into the stationary jaw. Zero the Tinius Olsen machine to clear data before the first sample is tested. Force is exerted in a direct line perpendicular to the plane of the substrate/stress plate interface at a crosshead speed of 2 in./min (51 mm/min). While the sample is being tested, the sample shall be visually examined to ensure that it continues to meet the Conditions of Acceptance. Continue the testing until the sample fails, higher forces are unable to be attained or maintained, or at the discretion of the test sponsor. Failure is considered to occur when the Conditions of Acceptance are no longer being met or until the tensile force is no longer able to be maintained. Upon completion of the test, the sample shall be examined and any item not conforming to the Conditions of Acceptance noted. The results of the Pull-Through Test shall be stated in pounds. The result assigned to the sample shall be the maximum force which the sample reached prior to failure. Conditions of Acceptance are: 1. all samples should remain secured in their test jig until failure of the test sample; 2. the overall sample results shall be determined based on the average of three (3) tests. If the standard deviation of the three values divided by the mean is greater than 20%, an additional test(s) shall be conducted. The results of all tests shall be used to determine the final average.

TABLE 2

Performance of polyisocyanurate board with different facer materials.

| Facer Type | GRF | CGF | Nonwoven PET | Woven PP |
| --- | --- | --- | --- | --- |
| Pull-through (lbf) | 177 | 262 | 263 | 455 |
| Wind uplift | 1-60 | 1-90 | 1-105 | 1-120 |

While the woven facer performed exceedingly well when compared to GRF and CGF with fastener pull-through/wind uplift, it also shows superior performance with regard to moisture resistance per ASTM C209-Water Absorption. This is shown below in Table 3.

TABLE 3

Moisture absorption of polyisocyanurate board with different facer materials.

| Facer Type | GRF | CGF | Nonwoven PET | Woven PP |
| --- | --- | --- | --- | --- |
| Water Absorption | 0.39% | 0.30% | 0.07% | 0.06% |

As a result of this testing, it was discovered that woven polypropylene facers 20A and 20B offered substantial benefits (as described herein) over traditional GRF and CGF facers.

In particular, the present woven facers 20A and 20B provide the advantages of strength in both (perpendicular) machine direction and cross directions. In preferred aspects, the strength in the cross direction is at least 70% of the strength in the machine direction.

In the case of woven facer materials supplied on rolls, the present facer materials preferably have weight of 20 gsm to 200 gsm; and a tensile strength of at least 80 lb. The advantage of this small thickness is that it makes the facers easier to roll.

In various optional aspects, the woven facers 20A and 20B can be made of natural and/or synthetic yarns and/or tapes. The synthetic yarns or tapes can be made from polymers such as polyethylene, ethylene and alpha-olefin copolymers, polypropylene, propylene and alpha-olefin copolymers, nylon, polyester, acrylic polyester, polyamide, aramid etc. The yarns can be made from natural fibers, such as cotton, cellulose, wool, rayon, silk, hemp, sisal, etc.

In preferred embodiments, the present insulation board assembly meets the Very Severe Hail (VSH) rating of FM 4470 (Class 1). This can even be accomplished using low or typical density insulation board. In one embodiment, the foam insulation board has a density of 0.5 to 6.0 pcf. This represent an advantage over existing (and costlier) approaches of using gypsum or press board to achieve the Very Severe Hail (VSH) rating.

In addition, the adhesion between the insulation board and the facer could potentially be stronger than can be achieved by existing standard density insulation boards and facers made of paper, glass fiber reinforced paper or coated glass facers (GRF/CGF), foils, films or laminates.

In optional preferred embodiments, the present insulation board with woven facer may also be used under a sheet of roof membrane, such as EPDM (Ethylene Propylene Diene Monomer), TPO (thermoplastic olefin), PVC (polyvinyl chloride), KEE (ketone ethylene ester) or Hypalon, of various thickness to provide a roofing structure capable of achieving the Very Severe Hail (VSH) rating. Optionally, EPDM, TPO, PVC, KEE and Hypalon roof membrane can have non-woven materials laminated on the back side. The non-woven fleece could potentially improve the adhesion performance of roof membrane to the insulation board.

In other optional preferred aspects, bonding adhesives are used to adhere the roof membrane onto the insulation board. Optionally, such bonding adhesive can include extruded coatings, spray coatings or roller applied coatings. Examples of such adhesive promoters include Flexible FAST™, TPO bonding adhesive, Cav-Grip III™ and EPDM bonding adhesive.

Roof System Performance:

Factory Mutual's 4470's procedure for Very Severe Hail (VSH) Testing is a new test standard that has had a significant impact on the construction of commercial roof systems in fourteen states throughout the Midwest. The test involved propelling a 2-inch-diameter ice ball at a roof system test specimen at a velocity of 152 to 160 feet per second. The membrane must not be punctured and it must remain adhered to the substrate board. The substrate boards cannot be cracked or have the facers delaminated from the foam to pass this test.

Two widely used cover boards (i.e.: High Density (HD) Polyiso and Gypsum board), that are used in the commercial roofing industry have been unable to withstand this VSH test (See Table 4 and 5 below). The only roofing systems that have been able to achieve limited success on the VSH rating so far have incorporated OSB cover boards and Plywood cover boards (See Table 6 below). However, the OSB and Plywood boards have significant limitation since they are expensive, heavier than 0.5" HD Polyiso, and are not able to achieve the same fire ratings that systems containing Gypsum or HD Polyiso cover boards.

TABLE 4

VSH test results for ½" SecurShield HD Polyiso board.

| Insulation | Membrane | Adhesive | Testing Location | VSH Results | Reason for failure |
|---|---|---|---|---|---|
| ½" SecurShield High Density Polyiso Board | 145 EPDM Fleece | Flex FAST | FM | Fail | Cracks in HD Board |
| | 115 EPDM Fleece | Flex FAST | FM | Fail | |
| | 90 mil EPDM | EPDM Bonding | FM | Fail | |
| | 75 mil Sure-Tough | EPDM Bonding | FM | Fail | |
| | 145 White EPDM Fleece | Flex FAST | FM | Fail | |
| | 115 White EPDM Fleece | Flex FAST | FM | Fail | |
| | 90 mil White EPDM | EPDM Bonding | FM | Fail | |
| | 135 PVC Fleece | Flex FAST | FM | Fail | |
| | 115 PVC Fleece | Flex FAST | FM | Fail | |
| | 80 mil PVC | PVC Bonding | FM | Fail | |
| | 135 TPO Fleece | Flex FAST | FM | Fail | |
| | 115 TPO Fleece | Flex FAST | FM | Fail | |
| | 80 mil TPO | TPO Bonding | FM | Fail | |

TABLE 5

VSH test results for ½" DensDeck Prime board (Gypsum).

| Insulation | Membrane | Adhesive | Testing Location | VSH Results | Reason for failure |
|---|---|---|---|---|---|
| ½" DensDeck Prime Board | 145 EPDM Fleece | Flex FAST | FM | Fail | Loss of Adhesion (gypsum turned to powder at area of impact) |
| | 115 EPDM Fleece | Flex FAST | FM | Fail | |
| | 90 mil EPDM | EPDM Bonding | FM | Fail | |
| | 75 mil Sure-Tough | EPDM Bonding | FM | Fail | |
| | 145 White EPDM Fleece | Flex FAST | FM | Fail | |
| | 115 White EPDM Fleece | Flex FAST | FM | Fail | |
| | 90 mil White EPDM | EPDM Bonding | FM | Fail | |
| | 135 PVC Fleece | Flex FAST | FM | Fail | |
| | 115 PVC Fleece | Flex FAST | FM | Fail | |
| | 80 mil PVC | PVC Bonding | FM | Fail | |
| | 135 TPO Fleece | Flex FAST | FM | Fail | |
| | 115 TPO Fleece | Flex FAST | FM | Fail | |
| | 80 mil TPO | TPO Bonding | FM | Fail | |

TABLE 6

VSH test results for StormBase (OSB) board.

| Insulation | Membrane | Adhesive | Testing Location | VSH Results | Reason for failure |
|---|---|---|---|---|---|
| StormBase (OSB) | 145 EPDM Fleece | Flex FAST | FM | Fail | cracks in OSB |
| | 115 EPDM Fleece | Flex FAST | FM | Fail | |
| | 90 mil EPDM | EPDM Bonding | FM | Fail | |
| | 90 mil White EPDM | EPDM Bonding | FM | Fail | |
| | 75 mil Sure-Tough | EPDM Bonding | FM | Fail | |
| | 115 White EPDM Fleece | Flex FAST | FM | Fail | |

TABLE 6-continued

VSH test results for StormBase (OSB) board.

| Insulation | Membrane | Adhesive | Testing Location | VSH Results | Reason for failure |
|---|---|---|---|---|---|
| | 145 White EPDM Fleece | Flex FAST | FM | Pass | |
| | 135 PVC Fleece | Flex FAST | FM | Fail | heat |
| | 115 PVC Fleece | Flex FAST | FM | Fail | aging |
| | 80 mil PVC | PVC Bonding | FM | Fail | fail |
| | 135 TPO Fleece | Flex FAST | FM | Pass | |
| | 115 TPO Fleece | Flex FAST | FM | Pass | |
| | 80 mil TPO | TPO Bonding | FM | Pass | |

In contrast to the above existing systems, various embodiments of the present invention (i.e.: systems containing high density and normal density Polyiso insulation boards made with woven polypropylene facer materials) showed significant improvement and were able to withstand the VSH Test. The present roof systems successfully passed both internal and Factory Mutual tests due to the unique physical properties provided by the present woven facers. The results are summarized in the Table 7 and 8 below.

As can be appreciated, the present roof systems using standard density or high density insulation board and woven PP facers can be paired with TPO FleeceBACK, EPDM FleeceBACK, PVC FleeceBACK, KEE FleeceBACK and bareback TPO, EPDM, PVC and KEE HP. These membranes may optionally be bonded with two-part polyurethane adhesive, TPO Bonding adhesives, PVC adhesives, EPDM Bonding Adhesives, water based adhesives, LVOC bonding adhesives and Cav-Grip III. This type of roof system has significant performance advantageous over that with OSB and plywood board as the insulation board with woven PP facer delivers higher R-value per inch and is less costly.

TABLE 7

VSH test results for ½" HD Polyiso board with woven PP facer.

| Insulation | Source | Membrane | Adhesive | Testing Location | VSH Results |
|---|---|---|---|---|---|
| ½" HD Polyiso w/ Woven PP Facer | This invention | 45 mil TPO | Cav-Grip III | in-house | pass |
| | | 60 mil TPO | Cav-Grip III | in-house | pass |
| | | 90 mil White EPDM | 90-8-30A | in-house | pass |
| | | 105 EPDM Fleece | Flex FAST | in-house | pass |
| | | 60 mil TPO | Cav-Grip III | FM | pass |
| | | 80 mil TPO | Cav-Grip III | FM | pass |

TABLE 8

VSH test results for normal density Polyiso board with woven PP facer.

| Insulation | Source | Membrane | Adhesive | Testing Location | VSH Results |
|---|---|---|---|---|---|
| Standard Density Polyiso w/Woven PP Facer | This invention | 80 mil TPO | Cav-Grip III | in-house | pass |
| | | 90 mil White EPDM | 90-8-30A | in-house | pass |
| | | 105 EPDM Fleece | Flex FAST | in-house | pass |
| | | 60 mil TPO | Cav-Grip III | FM | pass |
| | | 80 mil TPO | Cav-Grip III | FM | pass |

Figure 2:
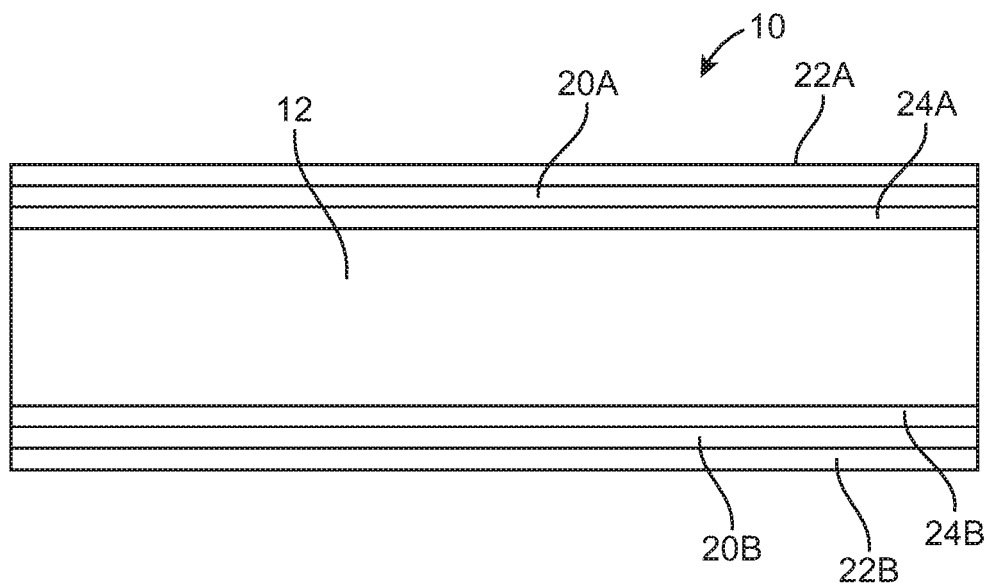
FIG. 2 is a sectional side elevation view of a foam insulation board similar to FIG. 1, but with a non-woven layer or coating above and below each of the top and bottom woven facers.

In preferred aspects illustrated in FIG. 2, the woven facers preferably include chemical coatings to make them waterproof. Specifically, system 10 comprises a foam insulation board 12, having a top woven facer 20A and a bottom woven facer 20B, as described above. Preferably, top woven facer 20A and bottom woven facer 20B comprise no glass fibers. Foam insulation board preferably has a density of 0.5 to 6.0 pcf and the fastener Pull-Through value is higher than 300 lbf. Preferably, the roof assembly 10 consists of roof membrane, bonding adhesive and the insulation board, and wherein the roof assembly meets the Very Severe Hail rating of FM 4470 (Class 1).

Preferably, each of woven facers 20A and 20B comprise yarns or tapes made from synthetic polymers such as woven polypropylene and/or propylene alpha-olefin copolymers or ethylene alpha-olefin copolymers having a warp density from 4 to 30 EPI or a weft density from 4 to 30 PPI, a weight from 40 to 200 grams per square meter, and a thickness of 2 mil to 50 mil. Preferably, each of the top and bottom facers 20A and 20B have a tensile strength greater than 80 lbf/3 inch in both a machine direction and a cross direction and a tear strength of over 15 lbf in both a machine direction and a cross direction.

As seen in FIG. 2, each of facers 20A and 20B may optionally have a polymer coating on one or both side of one or both of the top and bottom facers (i.e.: 22A, 24A, 22B and 24B). In preferred aspects, some or all of polymer coating layers 22A, 24A, 22B and 24B are selected from the group consisting of: polyethylene, ethylene and alpha-olefin copolymers, polypropylene, propylene and alpha-olefin copolymers, silicones, acrylates, polyurethane, natural rubber, and styrene butadiene rubber.

Alternatively, each of facers 20A and 20B may optionally have a non-woven material laminated on one or both side of one or both of the top and bottom facers (i.e.: layers 22A, 24A, 22B and 24B). The non-woven material layers may be selected from the group consisting of polyester, polyethylene, ethylene and alpha-olefin copolymers, polypropylene, propylene and alpha-olefin copolymers, nylon, glass, Kevlar, basalt, and carbon fiber. As such, layers 22A, 24A, 22B and 24B can comprise various polymer coatings or other non-woven material. Optionally, layers 24A and 24B can comprise a laminated glass mat, a glass scrim or a coated glass scrim.

Figure 3:
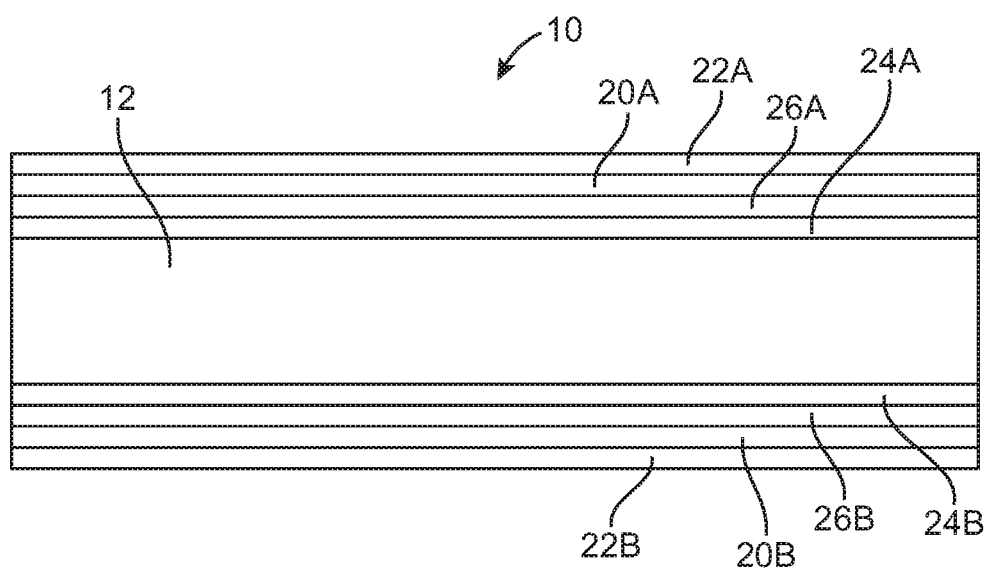
FIG. 3 is a sectional side elevation view of a foam insulation board similar to FIG. 2, but with a tie layer securing the woven and non-woven layers together.

Finally, as seen in FIG. 3, the non-woven layers 24A and 24B can be laminated to the woven layers 20A and 20B via an adhesive or a tie layer 26A, 26B.

In alternate aspects, the present system comprises a rolled insulation facer formed from a woven material having a tensile strength greater than 80 lbf/3 inch in both a machine direction and a cross direction, and a tear strength of over 15 lbf in both the machine direction and the cross direction. In this aspect, the woven material comprises yarns or tapes made from synthetic polymers, including but not limited to polypropylene and/or propylene alpha-olefin copolymers and/or ethylene alpha-olefin copolymers. Preferably, the woven material is waterproof.

What is claimed is:
1. An insulation board assembly, comprising:
   a foam insulation board having first and second opposing surfaces;
   a top single layer facer attached onto a top side of the foam insulation board, wherein the top single layer facer is in direct contact with the first surface of the foam insulation board, the top facer being made of woven material having a warp density from 4 to 30 ends per inch or a weft density from 4 to 30 picks per inch and a tensile strength greater than 80 lbf/3 inch in both a machine direction and a cross direction and a tear strength of over 15 lbf in both a machine direction and a cross direction, the top single layer facer defining an outermost top surface of the insulation board assembly; and a bottom single layer facer attached onto a bottom side of the foam insulation board, wherein the bottom single layer facer is in direct contact with the second surface of the foam insulation board, the bottom facer being made of woven material having a warp density from 4 to 30 ends per inch or a weft density from 4 to 30 picks per inch and a tensile strength greater than 80 lbf/3 inch in both a machine direction and a cross direction and a tear strength of over 15 lbf in both a machine direction and a cross direction, the bottom single layer facer defining an outermost bottom surface of the insulation board assembly, wherein the insulation board assembly when adhered or mechanically fastened onto a roof assembly permits the roof assembly to meet the Very Severe Hail rating of FM 4470 (Class 1), and wherein the woven material comprises woven polypropylene and/or propylene alpha-olefin copolymers or ethylene alpha-olefin copolymers.

2. The insulation board assembly of claim 1, wherein the foam board is a polyisocyanurate or polyurethane foam board.

3. The insulation board assembly of claim 1, wherein the top facer and the bottom facer comprise no glass fibers.

4. The insulation board assembly of claim 1, wherein the foam insulation board has a density of 0.5 to 6.0 pcf.

5. The insulation board assembly of claim 1, wherein the insulation board assembly exhibits a fastener Pull-Through value that is higher than 300 lbf.

6. The assembly of claim 1, wherein the woven material comprises yarns or tapes.

7. The assembly of claim 1, wherein the woven material has a weight from 40 to 200 grams per square meter.

8. The assembly of claim 1, wherein the woven material has a thickness of 2 mil to 50 mil.

* * * * *